United States Patent
Hobbs et al.

(10) Patent No.: US 10,655,775 B2
(45) Date of Patent: *May 19, 2020

(54) EXPANDABLE SOCKETS FOR USE WITH PORTABLE MEDIA PLAYERS

(71) Applicant: POPSOCKETS LLC, Boulder, CO (US)

(72) Inventors: Molly M. Hobbs, Boulder, CO (US); David B. Barnett, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,615

(22) Filed: Feb. 20, 2019

(65) Prior Publication Data

US 2019/0186680 A1    Jun. 20, 2019

Related U.S. Application Data

(63) Continuation of application No. 16/001,723, filed on Jun. 6, 2018, now Pat. No. 10,317,005, which is a
(Continued)

(51) Int. Cl.
*F16M 11/06* (2006.01)
*F16M 11/10* (2006.01)
(Continued)

(52) U.S. Cl.
CPC ............. *F16M 11/06* (2013.01); *F16M 11/10* (2013.01); *F16M 11/40* (2013.01); *F16M 13/00* (2013.01);
(Continued)

(58) Field of Classification Search
USPC ............................................. 455/575.8, 575.1
See application file for complete search history.

(56) References Cited

U.S. PATENT DOCUMENTS 1,590,823 A * 6/1926 Hewitt ................... H01R 13/33
200/51 R
2,094,268 A    9/1937 Friedman
(Continued)

FOREIGN PATENT DOCUMENTS

CN        2907146 Y      5/2007
CN      101087317 A     12/2007
(Continued)

OTHER PUBLICATIONS

Popsocket, "Estimate Based on Business Insider", Mar. 22, 2013 (Year: 2013).*
(Continued)

*Primary Examiner* — Ganiyu A Hanidu
(74) *Attorney, Agent, or Firm* — Irell & Manella, LLP

(57) ABSTRACT

An expandable socket for attachment to a portable media player or a portable media player case. The expandable socket generally includes a platform, a skin coupled to the platform, a button coupled to the skin opposite the platform, and a biasing element. The skin includes an outer wall, an inner wall spaced radially inward of the outer wall, and a cavity defined by the inner wall, wherein the skin is deformable between a collapsed configuration and an expanded configuration. The biasing element is arranged within the cavity of the skin between the platform and the button, such that the biasing element is at least partially surrounded by the inner wall of the skin. The biasing element is configured to bias the skin into the expanded configuration.

57 Claims, 3 Drawing Sheets

Related U.S. Application Data continuation of application No. 15/922,601, filed on Mar. 15, 2018, now Pat. No. 10,030,807, which is a continuation of application No. 15/803,410, filed on Nov. 3, 2017, now Pat. No. 9,958,107, which is a continuation of application No. 15/679,934, filed on Aug. 17, 2017, now Pat. No. 10,060,573, which is a continuation of application No. 15/615,900, filed on Jun. 7, 2017, now Pat. No. 10,054,259.

(60) Provisional application No. 62/376,237, filed on Aug. 17, 2016.

(51) Int. Cl.
| | |
|---|---|
| H04M 1/04 | (2006.01) |
| F16M 13/02 | (2006.01) |
| F16M 11/40 | (2006.01) |
| H01R 13/33 | (2006.01) |
| F16M 13/00 | (2006.01) |
| H04M 1/00 | (2006.01) |
| G06F 1/16 | (2006.01) |

(52) U.S. Cl.
CPC .......... *F16M 13/022* (2013.01); *H01R 13/33* (2013.01); *H04M 1/00* (2013.01); *H04M 1/04* (2013.01); *F16M 2200/025* (2013.01); *F16M 2200/065* (2013.01); *F16M 2200/08* (2013.01); *G06F 1/1626* (2013.01)

(56) References Cited

U.S. PATENT DOCUMENTS

| | | | |
|---|---|---|---|
| 2,876,979 | A | 3/1959 | Barbera |
| 2,880,902 | A | 4/1959 | Owsen |
| 3,425,595 | A | 2/1969 | Shapira |
| 3,781,922 | A | 1/1974 | Ericson |
| 4,111,407 | A | 9/1978 | Stager |
| 4,211,445 | A | 7/1980 | Woods |
| 4,846,510 | A | 7/1989 | Mikol |
| 4,878,863 | A * | 11/1989 | Swengel, Jr. .......... H01R 13/24 439/884 |
| 4,927,191 | A | 5/1990 | Mikol |
| 4,955,493 | A | 9/1990 | Touzani |
| 5,568,549 | A | 10/1996 | Wang |
| 5,807,144 | A * | 9/1998 | Sivard .......... 439/816 |
| 6,196,850 | B1 | 3/2001 | Dietz et al. |
| D471,547 | S | 3/2003 | Ruohonen |
| 6,736,285 | B2 | 5/2004 | Stewart-Stand |
| 6,776,660 | B1 | 8/2004 | Kubota et al. |
| 6,781,522 | B2 | 8/2004 | Sleva et al. |
| 6,814,416 | B2 | 11/2004 | Helot et al. |
| D532,004 | S | 11/2006 | Kettula et al. |
| 7,324,156 | B2 | 1/2008 | Lohr et al. |
| D570,593 | S | 6/2008 | Justiss |
| 7,422,486 | B2 | 9/2008 | Hoff et al. |
| 7,540,788 | B2 | 6/2009 | Murphy et al. |
| 7,581,119 | B2 | 8/2009 | Tupman et al. |
| 7,644,895 | B2 | 1/2010 | Tseng |
| 7,678,271 | B2 | 3/2010 | Curtin |
| 7,782,610 | B2 | 8/2010 | Diebel et al. |
| 7,822,448 | B2 | 10/2010 | Lin et al. |
| 7,983,034 | B1 | 7/2011 | Mohoney |
| D647,085 | S | 10/2011 | Chung et al. |
| 8,078,224 | B2 | 12/2011 | Fadell et al. |
| 8,080,975 | B2 | 12/2011 | Bessa et al. |
| 8,186,642 | B2 | 5/2012 | Weiss-Vons |
| 8,317,046 | B2 | 11/2012 | Vanderberg et al. |
| 8,560,031 | B2 | 10/2013 | Barnett et al. |
| 8,600,092 | B2 | 12/2013 | Parraga Gimeno et al. |
| 8,727,066 | B2 | 5/2014 | Jung et al. |
| 8,737,066 | B1 | 5/2014 | Block |
| 8,844,098 | B2 | 9/2014 | Karmatz |
| 9,787,348 | B2 | 10/2017 | Srour |
| 9,958,107 | B1 | 5/2018 | Hobbs et al. |
| 9,970,589 | B2 | 5/2018 | Hobbs et al. |
| 10,030,807 | B1 | 7/2018 | Hobbs et al. |
| 2002/0069582 | A1 | 6/2002 | Weder |
| 2003/0160055 | A1 | 8/2003 | Stewart-Stand |
| 2003/0214131 | A1* | 11/2003 | Kanao .......... F16L 21/002 285/238 |
| 2005/0243522 | A1 | 11/2005 | Nilsen et al. |
| 2007/0010821 | A1* | 1/2007 | Wilkinson .......... A61B 17/1631 606/86 A |
| 2007/0093786 | A1 | 4/2007 | Goldsmith et al. |
| 2007/0164036 | A1 | 7/2007 | Brandenburg |
| 2007/0181620 | A1 | 8/2007 | Carver |
| 2007/0293288 | A1 | 12/2007 | Lin et al. |
| 2008/0053770 | A1 | 3/2008 | Tynyk |
| 2008/0090443 | A1 | 4/2008 | Ackloo |
| 2008/0123287 | A1 | 5/2008 | Rossell et al. |
| 2008/0146958 | A1 | 6/2008 | Guillory et al. |
| 2008/0183275 | A1* | 7/2008 | Schmid .......... A61F 2/844 623/1.15 |
| 2008/0221404 | A1 | 9/2008 | Tso |
| 2008/0268916 | A1 | 10/2008 | Lin et al. |
| 2008/0273297 | A1 | 11/2008 | Kumar |
| 2009/0115367 | A1 | 5/2009 | Kidakam |
| 2009/0240297 | A1 | 9/2009 | Shavit et al. |
| 2010/0155550 | A1 | 6/2010 | Weiss-Vons |
| 2011/0015496 | A1 | 1/2011 | Sherman et al. |
| 2011/0036876 | A1 | 2/2011 | Fathollahi |
| 2011/0084081 | A1 | 4/2011 | Chung et al. |
| 2011/0117974 | A1 | 5/2011 | Spitalnik et al. |
| 2011/0216933 | A1 | 9/2011 | Lan |
| 2011/0252839 | A1 | 10/2011 | Stevens |
| 2011/0284547 | A1 | 11/2011 | McElligott et al. |
| 2011/0301439 | A1 | 12/2011 | Albert et al. |
| 2011/0306226 | A1 | 12/2011 | Montena |
| 2012/0042476 | A1 | 2/2012 | Karmatz |
| 2012/0329534 | A1* | 12/2012 | Barnett .......... F16M 11/10 455/575.8 |
| 2013/0126691 | A1* | 5/2013 | Miklas .......... B60N 3/102 248/311.2 |
| 2014/0317329 | A1 | 10/2014 | Barnett et al. |
| 2015/0077927 | A1 | 3/2015 | Barnett et al. |
| 2015/0301566 | A1 | 10/2015 | Santiago |
| 2016/0209733 | A1* | 7/2016 | Akai .......... F16M 11/041 |
| 2017/0195000 | A1 | 7/2017 | Srour |

FOREIGN PATENT DOCUMENTS

| | | |
|---|---|---|
| CN | 101090617 A | 12/2007 |
| CN | 201491236 U | 5/2010 |
| CN | 101742376 A | 6/2010 |
| CN | 201699919 U | 1/2011 |
| CN | 201750533 U | 2/2011 |
| CN | 103139692 A | 6/2013 |
| DE | 20 2011 105 790 U1 | 12/2011 |
| DE | 20 2017 001 222 U1 | 4/2017 |
| DE | 20 2017 004562 U1 | 9/2017 |
| DE | 20 2017 004 693 U1 | 10/2017 |
| EP | 3 373 566 B1 | 3/2019 |
| GB | 2316263 A | 2/1998 |
| RU | 2059399 C1 | 5/1996 |
| WO | WO-02/072221 A1 | 9/2002 |
| WO | WO-2005/019536 A2 | 3/2005 |
| WO | WO-2005/044413 A1 | 5/2005 |
| WO | WO-2012/125690 A1 | 9/2012 |
| WO | WO-2013/138500 A1 | 9/2013 |
| WO | WO-2014/074074 A1 | 5/2014 |

OTHER PUBLICATIONS

International Preliminary Report on Patentability and Written Opinion dor International Application PCT/US2017/047394, dated Feb. 19, 2019.
Defendants' Initial Invalidity Contentions, dated Apr. 26, 2019.
Exhibit A—CN101742376A (Chen).
Exhibit B—CN201491236 (Chen).
Exhibit —U.S. Pat. No. 8,600,092 (Gimeno).

(56) References Cited

OTHER PUBLICATIONS

Exhibit D—CN201699919U (Dai).
Exhibit E—CN2907146Y (Tianxu).
Exhibit F—CN201750533U (Chen).
Exhibit G—US20110216933A1 (Lan).
Exhibit H—WO2014074074 (Shihuang).
Exhibit I—CN103139692 (Longxun).
Exhibit J—U.S. Pat. No. 4,111,407 (Stager).
Exhibit K—WO02072221 (Wilkinson).
Exhibit L—WO2013138500 (Barnett).
Exhibit M—U.S. Appl. No. 61/375,096 (Karmatz).
Defendants' Invalidity Contentions for PopSockets v. Quest, U.S. Pat. No. 9,958,107, filed Oct. 11, 2018.
Exhibit 1004—Declaration of Dr. Glenn E. Vallee, Ph.D., P.E., to Petition for Inter Partes Review of U.S. Pat. No. 8,560,031, U.S. Patent and Trademark Office, Before the Patent Trial and Appeal Board, *Quest USA Corp.* v. *PopSockets LLC*, Case No. IPR2018-00497, Jan. 15, 2018.
Exhibit 1011—Webster's Third New International Dictionary (2002), to Petition for Inter Partes Review of U.S. Pat. No. 8,560,031, U.S. Patent and Trademark Office, Before the Patent Trial and Appeal Board, *Quest USA Corp.* v. *PopSockets LLC*, Case No. IPR2018-00497, Jan. 15, 2018.
Exhibit A—Claim Chart CN101742376A (Chen).
Exhibit B—Claim Chart CN201491236 (Chen).
Exhibit C—Claim Chart U.S. Pat. No. 8,600,092 (Gimeno).
Exhibit D—Claim Chart CN201699919U (Dai).
Exhibit E—Claim Chart CN2907146Y (Tianxu).
Exhibit F—Claim Chart CN201750533U (Chen).
Exhibit G—Claim Chart US20110216933A1 (Lan).
Exhibit H—Claim Chart WO2014074074 (Shihuang).
Exhibit I—Claim Chart CN103139692 (Longxun).
Exhibit J—Claim Chart U.S. Pat. No. 4,111,407 (Stager).
Initial Determination and Recommended Determination in the Matter of Certain Collapsible Sockets for Mobile Electronic Devices and Components Thereof, Investigation No. 337-TA-1056 (U.S. International Trade Commission), Jan. 31, 2018.
International Search Report and Written Opinion for International Application No. PCT/US2017/047394 dated Nov. 16, 2017.
Notice of Preliminary Rejection received for Korean Patent Application No. 10-2018-7003849, dated Apr. 19, 2018.
Office Action for U.S. Appl. No. 15/906,920, dated Jul. 13, 2018.
Office Action for U.S. Appl. No. 15/952,025, dated Sep. 26, 2018.
Office Action for U.S. Appl. No. 16/001,723, dated Jul. 27, 2018.
Petition for Inter Partes Review of U.S. Pat. No. 8,560,031, U.S. Patent and Trademark Office, Before the Patent Trial and Appeal Board, *Quest USA Corp.* v. *PopSockets LLC*, Case No. IPR2018-00497, Jan. 15, 2018.
Popsocket, Mar. 22, 2013.
*Quest USA Corp.,*v. *Popsockets LLC*, Case IPR2018-00497, U.S. Pat. No. 8,560,031; Popsockets LLC Preliminary Response and accompanying exhibits filed May 14, 2018.
*Quest USA* v. *PopSockets LLC*, Case IPR2018-00497, U.S. Pat. No. 8,560,031; Patent Owner's Response and accompanying exhibits filed Nov. 13, 2018.
*Quest USA* v. *PopSockets LLC*, Case IPR2018-01294, U.S. Pat. No. 8,560,031; Patent Owner's Preliminary Response and accompanying exhibits filed Oct. 29, 2018.
*Quest USA* v. *PopSockets LLC*, Case IPR2018-01294, U.S. Pat. No. 8,560,031; Petition for IPR and accompanying exhibits filed Jun. 21, 2018.
Supplemental Invalidity Contentions, dated Mar. 13, 2019.

\* cited by examiner

US 10,655,775 B2

EXPANDABLE SOCKETS FOR USE WITH PORTABLE MEDIA PLAYERS

CROSS-REFERENCE TO RELATED APPLICATIONS

This application is a continuation of U.S. application Ser. No. 16/001,723, filed Jun. 6, 2018, which is a continuation of U.S. application Ser. No. 15/922,601, filed Mar. 15, 2018, which is a continuation of U.S. application Ser. No. 15/803,410, filed Nov. 3, 2017, which is a continuation of U.S. application Ser. No. 15/679,934, filed Aug. 17, 2017, which claims priority under 35 U.S.C. § 119(e) to U.S. Provisional Application No. 62/376,237, filed Aug. 17, 2016, and is a continuation of U.S. application Ser. No. 15/615,900 filed Jun. 7, 2017, which claims priority under 35 U.S.C. § 119(e) to U.S. Provisional Application No. 62/376,237, filed Aug. 17, 2016. The entire respective disclosures of each of the above-identified applications are incorporated herein by reference.

FIELD OF THE INVENTION

The present invention relates generally to expandable sockets and more particularly to expandable sockets, which may also be referred to as collapsible sockets, that can be attached to portable media players (e.g., smart phones, MP3 players) or portable media player cases and used as grips, stands, or for other purposes.

BACKGROUND

U.S. Pat. No. 8,560,031, which issued Oct. 15, 2013, and is hereby incorporated herein by reference, discloses extending sockets, formed of accordions generally with buttons attached at their distal ends, for attaching to portable media players or portable media player cases. The sockets are used to wrap cords, as grips or stands, and to attach the player to another object.

However, a need remains in the art for other designs of collapsible grips and stands.

SUMMARY

One aspect of the present invention provides an expandable socket for attachment to a portable media player or a portable media player case. The expandable socket includes a base adapted to engage a portion of the portable media player or the portable media player case, a cover coupled to the base, wherein the cover is movable between a collapsed position and an expanded position, a button coupled to the cover opposite the base, and a spring arranged within the cover between the base and the button.

Another aspect of the present invention provides an expandable socket for attachment to a portable media player or a portable media player case. The expandable socket includes a base adapted to engage a portion of the portable media player or the portable media player case, a button that is spaced from and movable relative to the base, and a spring disposed between the base and the button, the spring arranged to resist movement of the button toward the base.

Another aspect of the present invention provides an expandable socket for attachment to a portable media player or a portable media player case. The expandable socket includes a base adapted to engage a portion of the portable media player or the portable media player case, an elastomeric skin coupled to the base and having a hollow shape, the skin including at least one folded section and being deformable between a collapsed position and an expanded position, a button coupled to the skin opposite the base, the button being disposed a first distance from the base when the skin occupies the collapsed position and a second distance greater than the first distance from the base when the skin occupies the expanded position, and a spring arranged within the skin between the base and the button, the spring configured to resist movement of the skin from the expanded configuration.

DETAILED DESCRIPTION OF THE PREFERRED EMBODIMENTS

Figure 1A:
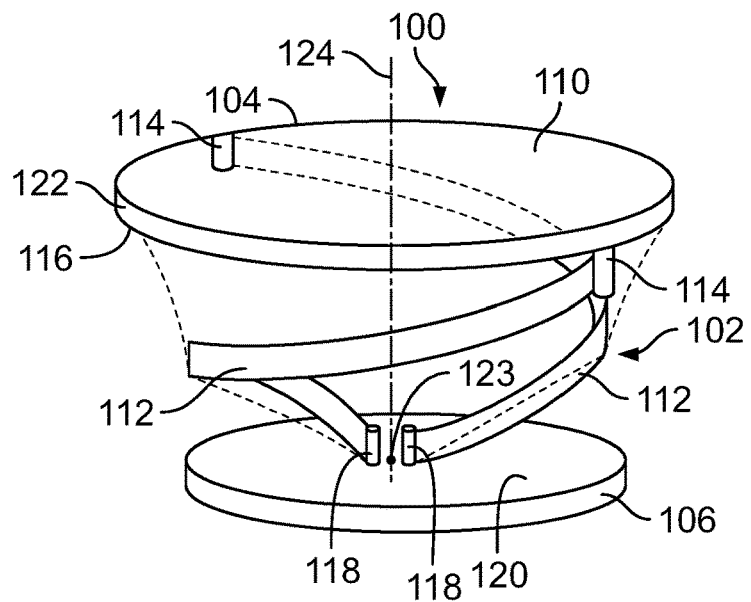
FIG. 1A is a side isometric, cutaway view of a first example of an expandable socket constructed in accordance with the teachings of the present invention, showing the socket in an expanded configuration.
Figure 1B:
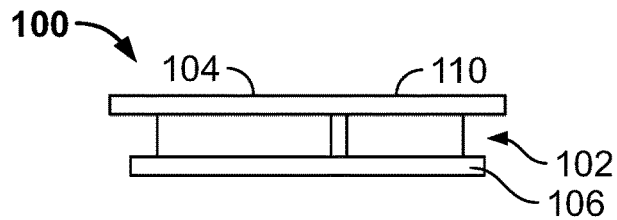
FIG. 1B is a side, cross-sectional view of FIG. 1A, showing the socket in a collapsed configuration.
Figure 2:
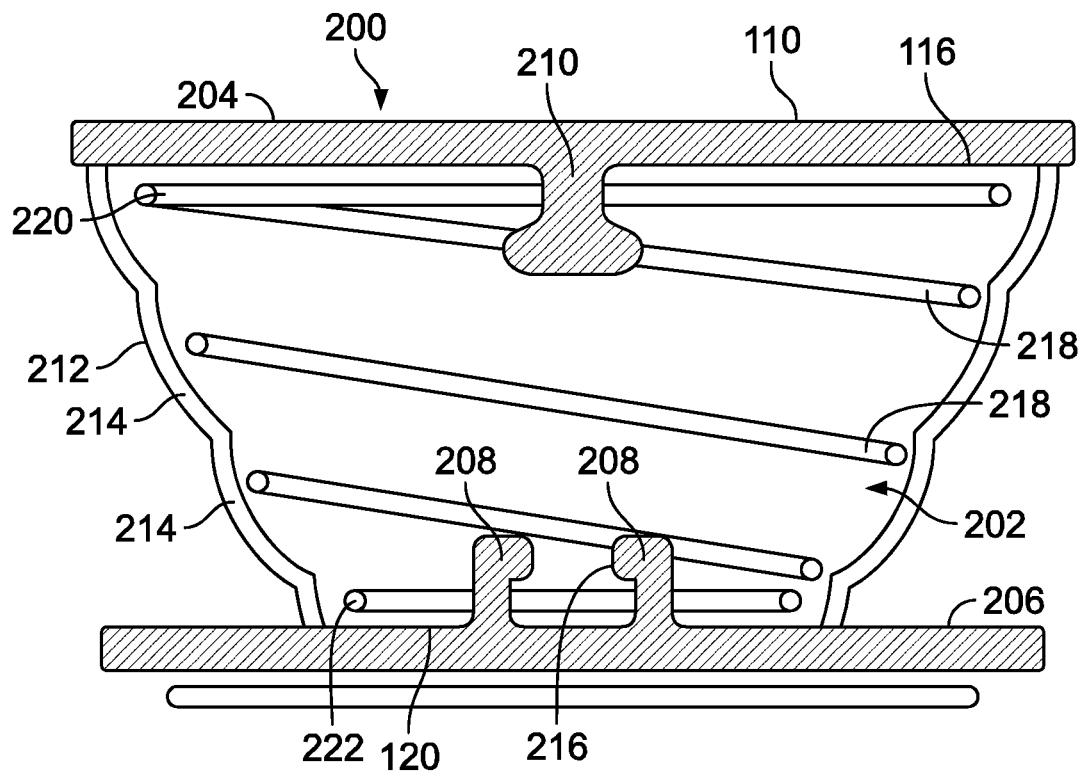
FIG. 2 is a side, cross-sectional view of a third example of an expandable socket constructed in accordance with the teachings of the present invention, showing the socket in an expanded configuration.

FIGS. 1A and 1B illustrate a first example of one example of an expandable socket 100 constructed in accordance with the teachings of the present invention. The expandable socket 100 in this example includes a button 104, a base 106, e.g., a platform, and a collapsible or expandable mechanism 102 coupled to and extending between the button 104 and the base 106. While removed from FIGS. 1A and 1B for clarity, the expandable socket 100 also includes a deformable cover (e.g., a cover as illustrated in FIG. 2) that is coupled to the button 104 and/or the base 106 in a manner that surrounds and houses (e.g., protects) the collapsible mechanism for safety and comfort. In other examples, the expandable socket 100 can include additional, different, and/or fewer components. As an example, the expandable socket 100 need not include the cover.

As best illustrated in FIG. 1A, the base 106 in this example has an annular shape. In other examples, however, the base 106 may instead have a rectangular, square, triangular, or other shape. The base 106 is preferably made of metal or plastic, though other suitable materials (e.g., cardboard) can be used. In any case, the base 106 is generally configured to be directly or indirectly coupled (e.g., attached, mounted) to a portable media player (e.g., an MP3 player, a smart phone, a tablet) or a case of such a portable media player. To this end, the base 106 can, in some cases, include a securing element known to one of ordinary skill in the art, such as, for example, adhesive, glue, tape, a suction cup, a snap-fit connection, a friction fit, other means, or combinations thereof. Alternatively, in other cases, the base 106 can be integrally formed with the portable media player or the case for the portable media player.

As best illustrated in FIG. 1A, the button 104 in this example has an annular shape. In other examples, however, the button 104 may have a rectangular, square, triangular, irregular, or other shape. The button 104 in this example also has an outer diameter that is larger than an outer diameter of the base 106, though this need not be the case. Like the base 106, the button 104 is preferably made of metal or plastic, though other suitable materials can be used. The button 104 has an outer side 110 that may, for example, include a design (including, e.g., a logo, text, graphics, a picture). In some cases, the design may be selected by a user of the expandable socket 100.

The collapsible or expandable mechanism 102 is generally configured to facilitate movement of the expandable socket 100 between an expanded configuration, illustrated in FIG. 1A, and a collapsed configuration, illustrated in FIG. 1B, and to retain the expandable socket 100 in the desired configuration (expanded or collapsed). In this example, the mechanism 102 takes the form of two, thin strip springs 112 arranged within the cover (not shown), with each spring 112 having a first end 114 coupled (e.g., mounted) to an inner side 116, i.e., an underside, of the button 104, and a second end 118 coupled (e.g., mounted) to an inner side 120 of the platform 106. The first end 114 of the each strip 112 is preferably coupled to the inner side 116 of the button 104 at or proximate to a perimeter edge 122 of the button 104, and the second end 118 of each strip 112 is preferably coupled to the inner side 116 of the platform 106 at or proximate to a center 123 of the platform 106. The first end 114 of each spring 112 may be removably coupled to the button 104, fixedly coupled to the button 104, or integrally formed with the button 104. Likewise, the second end 118 of each spring 112 may be removably coupled to the platform 106, fixedly coupled to the platform 106, or integrally formed with the platform 106.

In one example, the strips 112 are fabricated from spring steel or comparable metal. In another example, the strips 112 are produced from a stiff, flexible polymer. In any case, the strips 112 are preferably formed such that they are bistable, i.e., they each have two stable states in which they resist movement (at least initially), with one of the stable states being the expanded state shown in FIG. 1A, which corresponds to the expanded configuration of the expandable socket 100, and the other of the stable states being the collapsed state shown in FIG. 1B, which corresponds to the collapsed configuration of the expandable socket 100. Thus, when the strips 112 are in the expanded state shown in FIG. 1A, the strips 112 maintain (e.g., bias) the expandable socket 100 in the expanded configuration, and when the strips 112 are in the collapsed state shown in FIG. 1B, the strips 112 maintain (e.g., bias) the expandable socket 100 in the collapsed configuration.

In operation, the expandable socket 100 may be transitioned between the two configurations by manipulating the mechanism 102 between the two stable states. The mechanism 102 may be manipulated by grabbing or grasping the button 104 and rotating the button 104 about a longitudinal axis 124, which will in turn rotate the mechanism 102 coupled thereto about the same longitudinal axis 124, and/or grabbing or grasping the cover (not shown), which carries the mechanism 102, and rotating the cover about the longitudinal axis 124. The strips 112 will, in turn, rotate about the longitudinal axis 124, with the exact direction of rotation dependent upon whether the expandable socket 100 is being moved to the expanded configuration of FIG. 1A or the collapsed configuration of FIG. 1B. When, for example, the expandable socket 100 is moved from the expanded configuration of FIG. 1A to the collapsed configuration of FIG. 1B, the button 104 and the strips 112 will rotate in a first rotational direction (e.g., a counter-clockwise direction) about the longitudinal axis 124, thereby moving the button 104, the strips 112, and the cover toward the platform 106 along the longitudinal axis 124 in a first axial direction, and substantially reducing the profile of the expandable socket 100. Conversely, when the expandable socket 100 is moved from the collapsed configuration of FIG. 1B to the expanded configuration of FIG. 1A, the button 104, the strips 112, and the cover will rotate in a second direction, opposite the first direction, about the longitudinal axis 124, thereby moving the button 104, the strips 112, and the cover away from the platform 106 along the longitudinal axis 124 in a second axial direction opposite the first axial direction. Thus, the button 104 is spaced from the platform 106 so as to permit the user of the expandable socket 100 to wrap a headphone cord of the portable media player around a portion of the expandable socket 100, forming an adjustable stand for the portable media player, forming a grip for the portable media player, and/or to perform other desired functionality.

Figure 1C:
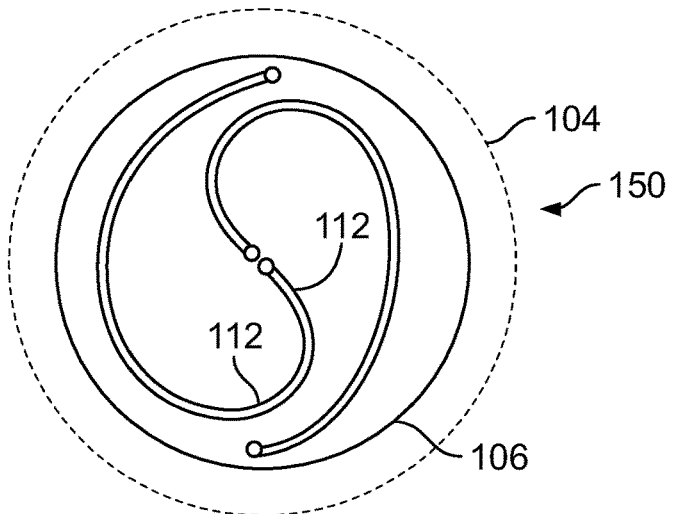
FIG. 1c is a top, cutaway view of a second example of an expandable socket constructed in accordance with the teachings of the present invention, showing the socket in a collapsed configuration.

FIG. 1C illustrates a second example an expandable socket 150 constructed in accordance with the teachings of the present invention. The expandable socket 150 is substantially similar to the expandable socket 100, in that it also includes the button 104, the platform 106, and the mechanism 102. However, in the expandable socket 150, the strips 112 are wrapped in the opposite direction from their path in the expandable socket 100. Thus, the expandable socket 150 may generally be transitioned between a collapsed configuration, shown in FIG. 1C, and an expanded configuration, not shown, by rotating the button 104 and/or the cover in a direction opposite how the button 104 and/or the cover are rotated in the expandable socket 100.

FIG. 2 illustrates a third example of an expandable socket 200 constructed in accordance with the teachings of the present invention. The expandable socket 200 generally includes a button 204, a base 206, a collapsible or expandable mechanism 202 coupled to and extending between the button 204 and the base 206, a deformable cover 212 that is coupled to the button 204 and/or the base 206 in a manner that surrounds and houses the collapsible mechanism 202 for safety and comfort, and a lock 214 configured to releasably secure the expandable socket 200 in a collapsed configuration that is not shown but is consistent with the collapsed configuration of the expandable socket 100 described above. In other examples, the expandable socket 200 may include additional, fewer, or different components. As an example, the expandable socket 200 may not include the cover 212.

The cover 212 is generally coupled to and disposed between the button 204 and the base 206. The cover 212 preferably takes the form of an elastomeric skin (made of an elastomeric material) that includes a plurality of folding sections 214 connected to one another between the button 204 and the base 206. In some examples, such as illustrated in FIG. 2, the plurality of folding sections 214 are arranged so as to form or a define a tapered conical shape that looks like an accordion. Thus, in these examples, the cover 212 has an outer diameter that tapers from the button 204 to the base 206 (though the opposite is possible as well). In other examples, the plurality of folding sections 214 may be arranged to form a different shape or the cover 212 may only include one folding section 214.

Like the collapsible mechanism 102, the collapsible mechanism 202 generally facilitates movement of the expandable socket 200 between an expanded configuration, illustrated in FIG. 2, and the collapsed configuration, not shown, and to retain the expandable socket 200 in the desired configuration (expanded or collapsed). However, the collapsible mechanism 202 in this example takes the form of a coil spring 218 (e.g., made of, for example, metal or plastic) that is arranged within the cover 212 between the button 204 and the base 206, such that the cover 212 surrounds and houses (e.g., protects) the coil spring 218. More particularly, the coil spring 218 has a first end 220 that is seated against the inner side 116 of the button 204 and a second end 222, opposite the first end 220, that is seated against the inner side 120 of the base 206. The coil spring 218 illustrated in FIG. 2 has a shape that substantially corresponds to the shape of the cover 212. In other words, the coil spring 218 illustrated in FIG. 2 has a conical or tapered shape, such that the first end 220 has an outer diameter that is larger than an outer diameter of the second end 222.

The button 204 in this example is similar to the button 104 described above, with common components referred to using common reference numerals. However, unlike the button 104, the button 204 also includes a first projection 210 that is carried by the and extends axially inward of and from the inner side 116 of the button 204. The base 206 in this example is likewise similar to the base 206 described above, with common components referred to using common reference numerals. However, unlike the base 106, the base 206 also includes a pair of second projections 208 that are carried by the inner side 120 of the base 206. The projections 208 extend axially inward from the inner side 120 of the base 206 before extending radially inward, thereby defining a recess 216 sized to receive the first projection 210.

As will be appreciated from FIG. 2, the coil spring 218 is arranged to bias the expandable socket 200 to its expanded configuration. More particularly, the coil spring 218 is arranged to bias the button 204 and the cover 212 away from the base 206 and to the positions shown in FIG. 2, which correspond to the expanded configuration of the expandable socket 200. Thus, the coil spring 218 may also be referred to herein as the biasing element 218. In any case, when the expandable socket 200 is in the expanded configuration, the button 204 is spaced from the platform 206 so as to permit the user of the expandable socket 200 to wrap a headphone cord of the portable media player around a portion of the expandable socket 200, forming an adjustable stand for the portable media player, forming a grip for the portable media player, and/or to perform other desired functionality.

The expandable socket 200 may be moved from this expanded configuration to the collapsed configuration by overcoming the biasing force applied by the coil spring 218. Generally speaking, the user of the expandable socket 200 may accomplish this by grabbing or grasping the button 204 and/or the cover 212 and moving (e.g., pushing) the button 204 and the cover 212 toward the platform 206 along a longitudinal axis 224. As the button 204 and the cover 212 are moved toward the platform 206 in this manner, the plurality of folding sections 214 fold onto one another and the button 204, the cover 212, and the coil spring 218 may rotate about the longitudinal axis 224.

As will also be appreciated from FIG. 2, the recess 216 is arranged to receive and retain the first projection 210 when the expandable socket 200 is moved to the collapsed configuration such that the button 204 is moved toward and into close proximity with the base 206. As this happens, the first projection 210 is moved past the second projections 208 and into the recess 216, at which time the second projections 208 engage the first projection 210 (and vice-versa). By virtue of the shape and size of the first projection 210 and the second projections 208, the first projection 210 is securely retained in the recess 216. In this manner, the first projection 210, the second projections 208, and the recess 216 define or form the lock 214 that locks the expandable socket 200 in the collapsed configuration.

One of ordinary skill in the art will appreciate that the first projection 210 and the second projections 208 can be reversed and yet still interact to help lock the Popsocket 200 in the collapsed configuration. More particularly, the first projection 210 can be carried by the base 206 and the second projections 208 (which define the recess 216) can be carried by the button 204.

The user of the expandable socket 200 may move the expandable socket 200 from the collapsed configuration to the expanded configuration by releasing the lock 214. Generally speaking, the user may release the lock 214 by grabbing or grasping and rotating the button 204 and/or the cover 212 about the longitudinal axis 224, which therefore rotates first projection 210 out of engagement with the second projections 208 and out of the recess 216. Once the lock 214 has been released, the biasing force of the coil spring 218 drives the button 204 and the cover 212 outward, away from the base 206, until the button 204 and the cover 212 reach the expanded configuration.

Figure 3A:
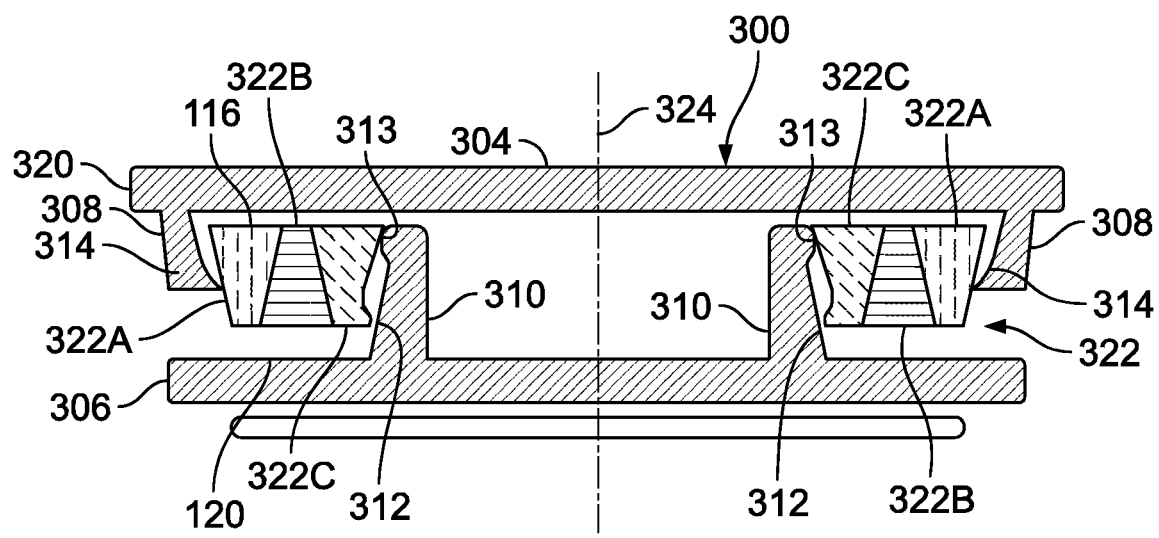
FIG. 3A is a side, cross-sectional view of a fourth example of an expandable socket constructed in accordance with the teachings of the present invention, showing the socket in a collapsed configuration.
Figure 3B:
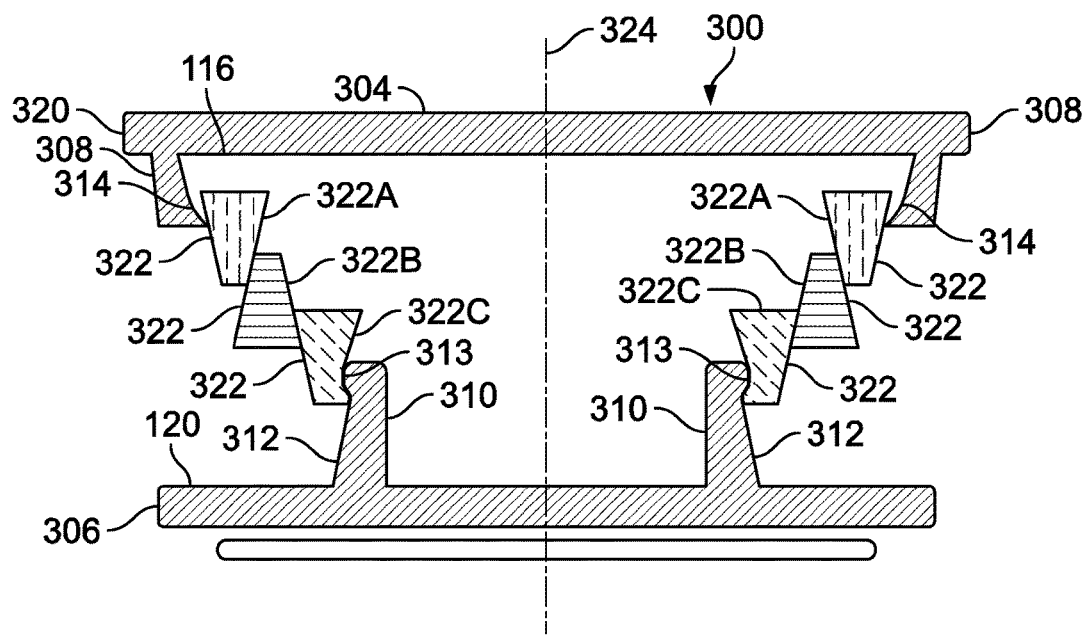
FIG. 3B is similar to FIG. 3A, but shows the socket in an expanded configuration.
Figure 3C:
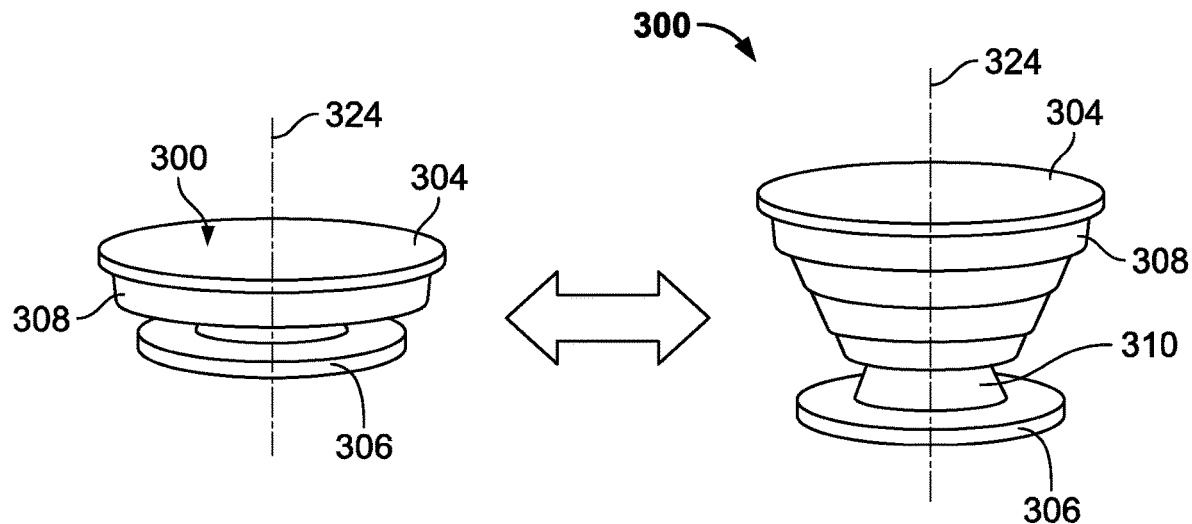
FIG. 3C is a side-by-side, perspective view of the socket of FIG. 3A and the socket of FIG. 3B.

FIGS. 3A-3C illustrate a fourth example of an expandable socket 300 constructed in accordance with the teachings of the present invention. The expandable socket 300 is similar to the expandable socket 200 in that it includes a button 304, a base 306, a collapsible or expandable mechanism 302 coupled to and extending between the button 304 and the base 306, and a lock configured to releasably secure the expandable socket 300 in an expanded configuration (shown in FIG. 3B), but is different from the expandable socket 200 in the manner described below. In other examples, the expandable socket 300 may include additional, fewer, or different components. As an example, the expandable socket 300 may also include a deformable cover such as the cover 212.

As with the collapsible mechanism 102 and the collapsible mechanism 202, the collapsible mechanism 302 generally facilitates movement of the expandable socket 300 between a collapsed configuration, shown in FIG. 3A, and the expanded configuration shown in FIG. 3B. However, the collapsible mechanism 302 in this example takes the form of a plurality of concentric rings 322 arranged between the button 304 and the base 306. In this example, the collapsible mechanism 302 includes three concentric rings 322A, 322B, and 322C each having a substantially wedge-shaped cross-section, though in other examples, more or less concentric rings may be employed and/or the concentric rings may have a different shape. In any case, the concentric rings 322 are movable relative one another along a longitudinal axis 324 as the expandable socket 300 moves between the collapsed and expanded configurations. Moreover, as illustrated in FIGS. 3A and 3B, the concentric ring 322B is movable within the concentric ring 322A and the concentric ring 322C is movable within the concentric ring 322B (and, in turn, the ring 322A) as the expandable socket 300 moves between the collapsed and expanded configurations.

The button 304 in this example is similar to the button 104 described above, with common components referred to using common reference numerals. However, unlike the button 104, the button 304 also includes a first, annular projection 308 that is carried by and extends axially inward of and from the inner side 116 of the button 304 at or proximate to a perimeter edge 320 of the button 304. The projection 308 in this example has an inner surface 314 that curves radially inward as the projection 308 extends away from the button 304. The inner surface 314 is therefore arranged to interface with an outermost one of the concentric rings 322 (the concentric ring 322A in this example) to help maintain the concentric rings 322 in the proper position between the button 304 and the base 306.

The base 306 in this example is similar to the base 106 described above, with common components referred to using common reference numerals. However, unlike the base 106, the base 306 includes a second, annular projection 310 that is carried by and extends axially inward of and from the inner side 120 of the base 106. The second projection 310 is disposed radially inward of both the first projection 308 and the concentric rings 322. In other words, the second projection 310 is nested within the first projection 308 and the concentric rings 322. The second projection 310 has an outer surface 312 that tapers as the projection 310 extends away from the base 306. A detent 313 is formed at or proximate to an end of the outer surface 312. The detent 313 is thus arranged to interface with an innermost one of the concentric rings 322 (the concentric ring 322C in this example) to help maintain the concentric rings 322 in the proper position between the button 304 and the base 306. In some examples, such as the one illustrated in FIGS. 3A and 3B, the innermost concentric ring 322 (322C in this example) may also include a groove that is sized to receive and interferingly engage the detent 313 in order to further help maintain the concentric rings 322 in the proper position.

In operation, the expandable socket 300 may be transitioned between the expanded and collapsed configurations by manipulating the button 304 and/or the mechanism 302. More particularly, the user of the expandable socket 300 may move the expandable socket 300 from the collapsed configuration (FIG. 3A) to the expanded configuration (FIG. 3B) by, for example, grabbing or grasping the button 304 and moving (e.g., pulling) the button 304 upward, away from the base 306, along the longitudinal axis 324. As briefly mentioned above, the expandable socket 300 includes a lock that may in turn lock, or securely retain, the expandable socket 300 in this expanded configuration. In this example, the lock is a friction-based lock that is defined by the detent 313 and the inner surface 315, which not only help to maintain the concentric rings 322 in the proper position between the button 304 and the base 306, but also respectively frictionally engage the innermost and outermost of the concentric rings 322 (322C and 322A, respectively, in this example) when the expandable socket 300 is in the expanded configuration. In this example, the concentric rings 322 are also shaped so as to frictionally engage one or both adjacent concentric rings 322 when the expandable socket 300 is in the expanded configuration, thereby helping to lock the expandable socket 300 in the expanded configuration. The user of the expandable socket 300 may release or disengage these locking features, and move the expandable socket 300 from the expanded configuration to the collapsed configuration, by, for example, moving (e.g., pushing, pressing) the button 304 downward, toward the base 306, along the longitudinal axis 324. As the expandable socket 300 is moved from the expanded configuration to the collapsed configuration, the concentric rings 322 nest within one another, with the innermost ring 322 nesting within the next innermost ring 322 and so on, until the projection 310 is positioned immediately adjacent or in contact with the inner side 116 of the button 304.

The invention claimed is:

1. An accessory for attachment to a portable media player or a portable media player case, the accessory comprising: a platform adapted to engage a portion of the portable media player or the portable media player case; a button that is movable relative to the platform; and a biasing element arranged between the platform and the button, the biasing element arranged to bias the button relative to the platform, wherein the button is movable between a first position, in which an outer surface of the button is disposed approximately adjacent the platform and is a first distance from the platform, and a second position, in which the outer surface of the button is spaced from the platform and is a second distance from the platform, the second distance being greater than the first distance, wherein the button comprises an inner surface facing the platform, an outer surface opposite the inner surface, and an annular wall carried by the inner surface, and wherein the biasing element is arranged radially inwardly of an outer surface of the annular wall.

2. The accessory of claim 1, wherein the annular wall extends axially inwardly away from the outer surface of the button.

3. The accessory of claim 1, wherein the biasing element is configured to push the button away from the platform.

4. The accessory of claim 1, further comprising a lock configured to releasably secure the button to the platform.

5. The accessory of claim 4, wherein the lock is carried by the platform.

6. The accessory of claim 1, wherein the biasing element comprises a coil spring.

7. The accessory of claim 1, wherein the button is movable between a first position, in which the button is disposed approximately adjacent the platform, and a second position, in which the button is spaced from the platform, and wherein the button is movable from the first position to the second position by rotating the button relative to the platform.

8. The accessory of claim 1, wherein the button is movable between a first position, in which the button is disposed approximately adjacent the platform, and a second position, in which the button is spaced from the platform, and wherein the button is releasable from the first position, allowing the button to move the second position, by rotating the button relative to the platform.

9. An accessory for attachment to a portable media player or a portable media player case, the accessory comprising:
   a platform adapted to engage a back of the portable media player or the portable media player case;
   a button that is movable relative to the platform, the button comprising an inner surface facing the platform, an outer surface opposite the inner surface and facing away from the platform, and an annular wall carried by the inner surface; and
   a biasing element arranged between the platform and the button and radially inwardly of an outer surface of the annular wall, the biasing element configured to bias the button relative to the platform,
   wherein the button is movable between a first position, in which the outer surface of the button is a first distance from the platform, and a second position, in which the outer surface of the button is a second distance from the platform, the second distance being different than the first distance, and wherein the button is releasable from the first position, allowing the button to move to the second position, by rotating the button relative to the platform.

10. The accessory of claim 9, wherein the biasing element is configured to push the button away from the platform.

11. The accessory of claim 9, further comprising a lock configured to releasably secure the button to the platform.

12. The accessory of claim 11, wherein the lock is carried by the platform.

13. The accessory of claim 9, wherein the annular wall extends axially inwardly away from the outer surface of the button.

14. The accessory of claim 9, wherein the biasing element comprises a coil spring.

15. The accessory of claim 9, further comprising a lock configured to releasably secure the button in the first position.

16. The accessory of claim 9, wherein the second distance is greater than the first distance, and wherein the button is configured to bias the button to the second position.

17. A method, comprising:
affixing an accessory to a back of a portable media player or a portable media player case, the accessory comprising a platform engaging the back of the portable media player or the portable media player case, a button that is movable relative to the platform, the button comprising an inner surface facing the platform, an outer surface opposite the inner surface and facing away from the platform, and an annular wall carried by the inner surface, and a biasing element arranged between the platform and the button and radially inwardly of an outer surface of the annular wall, the biasing element configured to bias the button relative to the platform, wherein the button is movable between a first position, in which an outer surface of the button is disposed approximately adjacent the platform and is a first distance from the platform, and a second position, in which the outer surface of the button is spaced from the platform and is a second distance from the platform, the second distance being greater than the first distance.

18. The accessory of claim 1, wherein the biasing element is configured to push the button toward the platform.

19. The accessory of claim 1, wherein the biasing element is configured to push the button away from and toward the platform.

20. The accessory of claim 4, wherein the lock comprises one or more projections from the platform.

21. The accessory of claim 20, wherein the lock further comprises structure in the button for receiving the one or more projections.

22. The accessory of claim 21, wherein the structure comprises a recess.

23. The accessory of claim 1, wherein the biasing element comprises an elastomeric material.

24. The accessory of claim 1, wherein the biasing element comprises a spring surrounded by an elastomeric material.

25. The accessory of claim 9, wherein the biasing element is configured to push the button toward the platform.

26. The accessory of claim 9, wherein the biasing element is configured to push the button away from and toward the platform.

27. The accessory of claim 11, wherein the lock comprises one or more projections from the platform.

28. The accessory of claim 11, wherein the lock further comprises structure in the button for receiving the one or more projections.

29. The accessory of claim 28, wherein the structure comprises a recess.

30. The accessory of claim 9, wherein the biasing element comprises an elastomeric material.

31. The accessory of claim 9, wherein the biasing element comprises a spring surrounded by an elastomeric material.

32. An accessory for attachment to a portable media player or a portable media player case, the accessory comprising: a platform adapted to engage a portion of the portable media player or the portable media player case; a button that is movable relative to the platform; and a biasing element arranged between the platform and the button, the biasing element arranged to bias the button relative to the platform, wherein the button is movable between a first position, in which the button is disposed approximately adjacent the platform, and a second position, in which the button is spaced from the platform, and wherein the button is movable from the first position to the second position by rotating the button relative to the platform, wherein the button comprises an inner surface facing the platform, an outer surface opposite the inner surface, and an annular wall carried by the inner surface, and wherein the biasing element is arranged radially inwardly of an outer surface of the annular wall.

33. The accessory of claim 32, wherein the annular wall extends axially inwardly away from the outer surface of the button.

34. The accessory of claim 32, wherein the biasing element is configured to push the button away from the platform.

35. The accessory of claim 32, wherein the biasing element is configured to push the button toward the platform.

36. The accessory of claim 32, wherein the biasing element is configured to push the button away from and toward the platform.

37. The accessory of claim 32, further comprising a lock configured to releasably secure the button to the platform.

38. The accessory of claim 37, wherein the lock is carried by the platform.

39. The accessory of claim 37, wherein the lock comprises one or more projections from the platform.

40. The accessory of claim 39, wherein the lock further comprises structure in the button for receiving the one or more projections.

41. The accessory of claim 40, wherein the structure comprises a recess formed in the button.

42. The accessory of claim 32, wherein the biasing element comprises a coil spring.

43. The accessory of claim 32, wherein the biasing element comprises an elastomeric material.

44. The accessory of claim 32, wherein the biasing element comprises a spring surrounded by an elastomeric material.

45. An accessory for attachment to a portable media player or a portable media player case, the accessory comprising: a platform adapted to engage a portion of the portable media player or the portable media player case; a button that is movable relative to the platform; and a biasing element arranged between the platform and the button, the biasing element arranged to bias the button relative to the platform, wherein the button is movable between a first position, in which the button is disposed approximately adjacent the platform, and a second position, in which the button is spaced from the platform, and wherein the button is releasable from the first position, allowing the button to move the second position, by rotating the button relative to the platform, wherein the button comprises an inner surface facing the platform, an outer surface opposite the inner surface, and an annular wall carried by the inner surface, and wherein the biasing element is arranged radially inwardly of an outer surface of the annular wall.

46. The accessory of claim 45, wherein the annular wall extends axially inwardly away from the outer surface of the button.

47. The accessory of claim 45, wherein the biasing element is configured to push the button away from the platform.

48. The accessory of claim 45, wherein the biasing element is configured to push the button toward the platform.

49. The accessory of claim 45, wherein the biasing element is configured to push the button away from and toward the platform.

50. The accessory of claim 45, further comprising a lock configured to releasably secure the button to the platform.

51. The accessory of claim 50, wherein the lock is carried by the platform.

52. The accessory of claim 50, wherein the lock comprises one or more projections from the platform.

53. The accessory of claim 52, wherein the lock further comprises structure in the button for receiving the one or more projections.

54. The accessory of claim 53, wherein the structure comprises a recess formed in the button.

55. The accessory of claim 45, wherein the biasing element comprises a coil spring.

56. The accessory of claim 45, wherein the biasing element comprises an elastomeric material.

57. The accessory of claim 45, wherein the biasing element comprises a spring surrounded by an elastomeric material.

\* \* \* \* \*